(12) United States Patent
Zhou et al.

(10) Patent No.: US 12,446,838 B2
(45) Date of Patent: Oct. 21, 2025

(54) TOMOGRAPHIC 3D IMAGING WITH A CAMERA ARRAY

(71) Applicant: DUKE UNIVERSITY, Durham, NC (US)

(72) Inventors: Kevin Zhou, Durham, NC (US); Roarke Horstmeyer, Durham, NC (US)

(73) Assignee: DUKE UNIVERSITY, Durham, NC (US)

( * ) Notice: Subject to any disclaimer, the term of this patent is extended or adjusted under 35 U.S.C. 154(b) by 435 days.

(21) Appl. No.: 18/110,678

(22) Filed: Feb. 16, 2023

(65) Prior Publication Data
US 2023/0255572 A1 Aug. 17, 2023

Related U.S. Application Data

(60) Provisional application No. 63/310,725, filed on Feb. 16, 2022.

(51) Int. Cl.
*A61B 6/03* (2006.01)
*G06T 7/80* (2017.01)
*G06T 11/00* (2006.01)

(52) U.S. Cl.
CPC ............ *A61B 6/03* (2013.01); *G06T 7/80* (2017.01); *G06T 11/005* (2013.01); *G06T 11/006* (2013.01); *G06T 2207/10072* (2013.01)

(58) Field of Classification Search
None
See application file for complete search history.

(56) References Cited

U.S. PATENT DOCUMENTS

| | | | |
|---|---|---|---|
| 2011/0178409 A1* | 7/2011 | Harris | G02B 23/2423 359/389 |
| 2016/0027609 A1* | 1/2016 | Sharma | H01J 37/261 250/307 |

OTHER PUBLICATIONS

Carrasco-Zevallos, Oscar M., et al., "Review of intraoperative optical coherence tomography: technology and applications [Invited]," Biomedical Optics Express, Mar. 1, 2017, p. 1607-37, vol. 8, issue 3.

(Continued)

*Primary Examiner* — Edwin C Gunberg
(74) *Attorney, Agent, or Firm* — Talem IP Law, LLP

(57) ABSTRACT

A tomographic 3D imaging system includes a conic-section mirror serving as the imaging objective, a sample holder positioned to hold a sample at a focus ($f_p$) of the conic-section mirror, a light source directing light to the sample, and an array of camera sensors positioned above the conic-section mirror. In some cases, the array of camera sensors is positioned parallel to a directrix of the conic-section mirror. In some cases, the conic-section mirror is a parabolic mirror. In some cases, each camera sensor of the array of camera sensors is positioned facing the sample holder at an inclination angle dictated by a lateral position of the camera sensor according to $$\theta(r) = 2\tan^{-1}\left(\frac{r}{2f_p}\right),$$

where r is the radial entry position across the parabolic mirror.

18 Claims, 5 Drawing Sheets

(56) References Cited

OTHER PUBLICATIONS

Chowdhury, Shwetadwip, et al., "High-resolution 3D refractive index microscopy of multiple-scattering samples from intensity images," Optica, Sep. 20, 2019 (accessible Aug. 30, 2019), 24 pages, vol. 6, issue 9.

Dowski, Edward R., Jr., et al., "Extended depth of field through wave-front coding," Applied Optics, Apr. 10, 1995, pp. 1859-1866, vol. 34, issue 11.

Gordon, Richard, et al., "Algebraic Reconstruction Techniques (ART) for three-dimensional electron microscopy and X-ray photography," Journal of Theoretical Biology, Dec. 1970, pp. 471-481, vol. 29, issue 3.

Guo, Changliang, et al., "Fourier light-field microscopy," Optics Express, Sep. 2, 2019 (accessible Aug. 26, 2019), pp. 25573-25594, vol. 27, issue 18.

Huang, David, et al., "Optical Coherence Tomography," Science, Nov. 22, 1991 (accessible Nov. 9, 2015), 12 pages, vol. 254, issue 5035.

Klein, Thomas, et al., "High-speed OCT light sources and systems [Invited]," Biomedical Optics Express, Feb. 1, 2017, pp. 828-859, vol. 8, issue 2.

Lauer, V., "New approach to optical diffraction tomography yielding a vector equation of diffraction tomography and a novel tomographic microscope," Journal of Microscopy, Feb. 2002, pp. 165-176, vol. 205, issue 2.

Levoy, Marc, et al., "Light field microscopy," ACM SIGGRAPH 2006 Papers, 2006, 11 pages, ACM, New York, NY.

Liu, Renhao, et al., "Recovery of Continuous 3D Refractive Index Maps from Discrete Intensity-Only Measurements using Neural Fields," Aug. 15, 2022 (accessible: Nov. 27, 2021), 44 pages, arXiv.

Mildenhall, Ben, et al., "NeRF: representing scenes as neural radiance fields for view synthesis," Communications of the ACM, Jan. 2022 (accessible: Dec. 17, 2021), pp. 99-106, vol. 65, issue 1.

Müller, Thomas, et al., "Instant neural graphics primitives with a multiresolution hash encoding," ACM Transactions on Graphics, Jul. 2022 (accessible Jan. 16, 2022), pp. 1-15, vol. 41, issue 4, article 102.

Sarder, P., et al., "Deconvolution methods for 3-D fluorescence microscopy images," IEEE Signal Processing Magazine, May 2006, pp. 32-45, vol. 23, issue 3.

Sharpe, James, et al., "Optical Projection Tomography as a Tool for 3D Microscopy and Gene Expression Studies," Science, Apr. 19, 2002, pp. 541-545, vol. 296, issue 5567.

Shepp, L. A., et al., "The Fourier reconstruction of a head section," IEEE Transactions on Nuclear Science, Jun. 1974, pp. 21-43, vol. 21, issue 3.

Triggs, Bill, et al., "Bundle Adjustment—A Modern Synthesis," Vision Algorithms: Theory and Practice, Lecture Notes in Computer Science (LNCS), 2000 (accessible: Sep. 1999), pp. 298-372, vol. 1883.

Ullman, Shimon "The interpretation of structure from motion," Proceedings of the Royal Society of London. SeriesB. Biological Sciences, Jan. 15, 1979, pp. 405-426, vol. 203, issue 1153.

Voleti, Venkatakaushik, et al., "Real-time volumetric microscopy of in vivo dynamics and large-scale samples with SCAPE 2.0," Nature Methods, Oct. 2019, 20 pages, vol. 16, issue 10.

Yanny, Kyrollos, et al., "Miniscope3D: optimized single-shot miniature 3D fluorescence microscopy," Light: Science & Applications, Oct. 2, 2020, pp. 1-13, vol. 9, issue 1, article 171.

Zhou, Kevin C., et al. "Diffraction tomography with a deep image prior," Optics Express, Apr. 27, 2020, pp. 12872-12896, vol. 28, issue 9.

Zhou, Kevin C., et al., "Computational 3D microscopy with optical coherence refraction tomography," Optica, Jun. 20, 2022 (accessible: Jun. 2, 2022), pp. 593-601, vol. 9, issue 6.

Zhou, Kevin C., et al., "Unified k-space theory of optical coherence tomography," Advances in Optics and Photonics, Jun. 30, 2021 (accessible Dec. 9, 2020), 43 pages, vol. 13, issue 2.

Zhou, Kevin C., et al., "High-speed multiview imaging approaching 4pi steradians using conic section mirrors: theoretical and practical considerations," Journal of the Optical Society of America A, Dec. 1, 2021 (accessible: Nov. 17, 2021), p. 1810-22, vol. 38, issue 12.

Zhou, Kevin C., et al., "Optical coherence refraction tomography," Nature Photonics, Nov. 2019, pp. 794-802, vol. 13, issue 11.

Zipfel, Warren R., et al., "Nonlinear magic: multiphoton microscopy in the biosciences," Nature Biotechnology, Nov. 2003 (accessible Oct. 31, 2003), pp. 1369-1377, vol. 21, issue 11.

* cited by examiner

TOMOGRAPHIC 3D IMAGING WITH A CAMERA ARRAY

CROSS-REFERENCE TO RELATED APPLICATIONS

This application claims the benefit of U.S. Provisional Application Ser. No. 63/310,725, filed Feb. 16, 2022.

BACKGROUND

Non-invasive tomographic three-dimensional (3D) imaging has revolutionized basic scientific and medical research by revealing internal structures in their native biological context within thick samples. However, dense tomographic 3D imaging requires potentially orders of magnitude more data than two-dimensional (2D) imaging, making high-speed tomographic imaging very challenging. For example, point-scanning techniques, such as confocal microscopy and multiphoton microscopy can be slow due to the need to perform inertially-constrained scanning of a focused point in three dimensions. Computational reconstruction techniques such as those used in optical projection tomography and optical diffraction tomography (ODT) can require hundreds of multi-angle images.

When attempting to speed up the scanning or reconstruction, techniques that perform data under-sampling and that use compressive sensing techniques to fill in the information gaps, while useful in a few applications, often rely heavily on regularization or priors, such as a total variation (TV) or spatial sparsity, whose assumptions are not always met. Thus, the large data requirement for dense tomographic imaging often necessitates chemically fixing, immobilizing, or otherwise restricting the sample's movements, thereby disrupting its natural physiological state. Therefore, there is a need for tomographic imaging techniques that allow for tomographic imaging of unrestrained organisms.

BRIEF SUMMARY

The systems and methods described herein enable tomographic 3D imaging using an array of cameras. The described $2\pi$ Fourier light field tomography ($2\pi$-FLIFT) imaging system allows for synchronized snapshots of a sample taken from multiple views over a wide angular range without perturbing the sample, from which a dense 3D volume can be computationally reconstructed. The described systems and methods may be applied to image freely-moving model organisms or can provide surgical guidance at millimeter-to centimeter-scale fields of view and at high speeds.

A tomographic 3D imaging system includes a conic-section mirror serving as the imaging objective, a sample holder positioned to hold a sample at a focus ($f_p$) of the conic-section mirror, a light source directing light to the sample, and an array of camera sensors positioned above the conic-section mirror.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

The systems and methods described herein enable tomographic 3D imaging using an array of cameras. The described $2\pi$ Fourier light field tomography ($2\pi$-FLIFT) imaging system allows for synchronized snapshots of a sample taken from multiple views over a wide angular range. without perturbing the sample, from which a dense 3D volume can be computationally reconstructed. The described systems and methods may be applied to image freely-moving model organisms or can provide surgical guidance at millimeter-to centimeter-scale fields of view and at high speeds.

Figure 1:
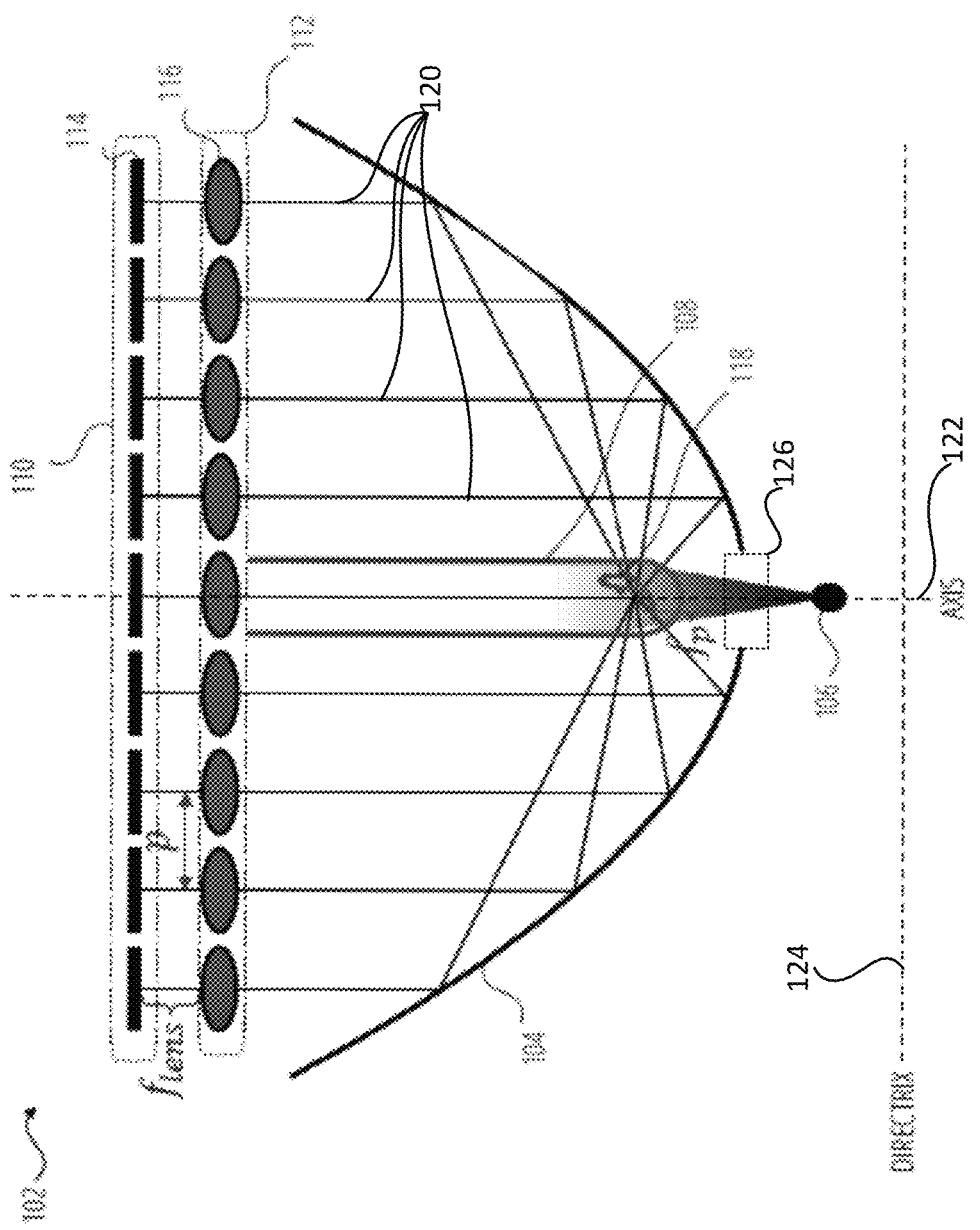
FIG. 1 illustrates a $2\pi$ Fourier light field tomography imaging system.

FIG. 1 illustrates a $2\pi$ Fourier light field tomography imaging system. Referring to FIG. 1, the $2\pi$-FLIFT imaging system 102 includes a conic-section mirror 104, a light source 106, a sample holder 108, and an array of camera sensors 110.

The array of camera sensors 110 includes a plurality of camera sensors (e.g., camera sensor 114). The $2\pi$-FLIFT imaging system 102 may further include an array of lenses 112. The array of lenses 112 includes a plurality of lenses (e.g., lens 116), each lens 116 corresponding to a camera sensor 114 of the array of camera sensors 110. Each lens 116 in the array of lenses 112 is positioned a focal length distance ($f_{lens}$) away from the corresponding camera sensor 114 in the array of camera sensors 110 so that the object planes are at infinity. Central chief rays 120 (or optical axes) pass through the lenses of the array of lenses 112 for each camera sensor 114/lens 116 pair.

In some cases, the conic-section mirror 104 is a circular paraboloid (e.g., a parabolic mirror). In some cases, the conic-section mirror 104 has exactly one axis of symmetry (i.e., the parabolic axis 122). In some cases, on the parabolic axis 122 of the conic-section mirror 104, there is a focus (or focus point). In some cases, the focus ($f_p$) is a fixed point located inside the conic-section mirror 104 and is the point to which all on-axis rays (parallel to the parabolic axis 122 of the conic-section mirror 104) converge. In some cases, the directrix 124 of the conic-section mirror 104 is a straight line in front of the conic-section mirror 104 and is perpendicular to the parabolic axis 122.

The sample holder 108 is positioned to hold the sample 118 at the focus ($f_p$) of the conic-section mirror 104. The sample holder 108 is transparent to maximize visibility of the sample 118 within the sample holder 108. In some cases, the sample holder 108 has a uniform wall thickness. Examples of preferred shapes for the sample holder 108 include a spherical shell or a cylindrical tube. For example, nuclear magnetic resonance (NMR) spectroscopy tubes (which are transparent, round-bottomed, and are produced to have as uniform wall thickness as possible) may be used as a sample holder. The sample holder 108 size may be dependent on the imaging problem scale.

The sample 118 is illuminated by a light source (e.g., light source 106). In some cases, as illustrated in FIG. 1, the sample 118 is illuminated though an aperture 126 at the bottom of the conic-section mirror 104. The aperture 126 is sized so that it is large enough to allow adequate illumination light to pass through, but small enough to avoid preventing signal from reaching the center-most camera sensor 114 of the array of camera sensors 110. In some cases, the sample 118 is illuminated by a light source which directs light from above (not shown).

The conic-section mirror 104 is sized relative to the array of camera sensors 110, such that the conic-section mirror 104 can act as a common reflective object for each camera sensor 114 in the array of camera sensors 110. The array of camera sensors 110 is positioned with each camera sensor 114 of the array of camera sensors 110 facing the sample holder 108. The array of camera sensors 110 and the array of lenses 112 are parallel to the directrix of the conic-section mirror 104 (i.e., perpendicular to the parabolic axis of the conic-section mirror 104).

To obtain multi-view images of the sample 118, each camera sensor 114 captures one or more images of the sample 118 from a different inclination angle. In cases in which the conic-section mirror 104 is a parabolic mirror, the inclination angle of each camera sensor 114 is dictated by a lateral position of the camera sensor 114 according to the following equation:

$$\theta(r) = 2\tan^{-1}\left(\frac{r}{2f_p}\right),$$

where r is the radial entry position across the conic-section mirror 104. Although this equation is specific to parabolic mirrors, this equation (and others described herein) can be modified (e.g., via known modifications that are apparent to those having ordinary skill in the art) to account for other types of conic-section mirrors, including but not limited to spherical and ellipsoidal mirrors.

Therefore, as long as the lateral position of the outermost camera sensor (outermost relative to the parabolic axis 122 of the conic-section mirror 104) is equal to or greater than $2f_p$ from the parabolic axis 122 of the conic-section mirror 104, the array of camera sensors 110 of the 2π-FLIFT imaging system 102 can obtain multi-view images over at least 2π steradians. In some cases, the outermost camera sensor of the array of camera sensors 110 from the parabolic axis 122 of the conic-section mirror 104 is less than $2f_p$. In some cases, the outermost camera sensor of the array of camera sensors 110 from the parabolic axis 122 of the conic-section mirror 104 is equal to $2f_p$. In some cases, the outermost camera sensor of the array of camera sensors 110 from the parabolic axis 122 of the conic-section mirror 104 is greater than $2f_p$.

Figure 6A:
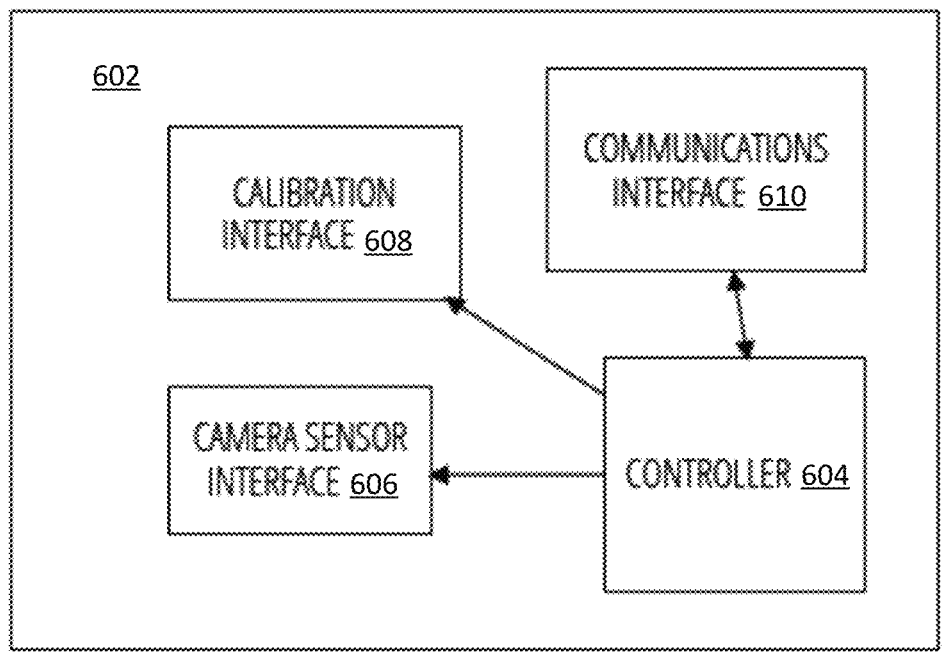
FIG. 6A illustrates a system controller for implementing functionality of a $2\pi$-FLIFT imaging system.

In some cases, the 2π-FLIFT imaging system 102 further includes a system controller (e.g., controller 604 of FIG. 6A). In some cases, the system controller is coupled to the array of camera sensors 110 to receive data (e.g., the images) from the camera sensors 114. In some cases, a conic-section mirror 104 can be a parabolic reflector.

Figure 2:
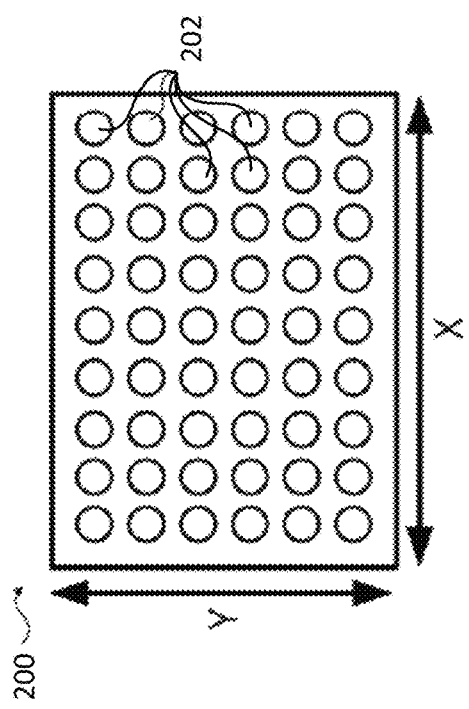
FIG. 2 illustrates an example configuration of an array of camera sensors for use in a $2\pi$-FLIFT imaging system.

FIG. 2 illustrates an example configuration of an array of camera sensors for use in a 2π-FLIFT imaging system (e.g., 2π-FLIFT imaging system 102). The array of camera sensors 200 is an array of individual camera sensors 202 arranged in an X-Y plane (e.g., an X-Y configuration). For example, the array of camera sensors 200 depicted FIG. 2 (as well as array of camera sensors 114) are arranged in a 6 camera sensor by 9 camera sensor configuration, for a total of 54 individual camera sensors 202. The individual camera sensors 202 of the array of camera sensors 200 are equally spaced with respect to one another, having an inter-camera spacing of (p). For example, in some cases, the individual camera sensors 202 have an inter-camera spacing of p=13.5 mm. In some cases, the inter-camera spacing is any width that is lower-bound limited by the camera sensor width (e.g., so that the camera sensors do not overlap) and would not include an upper-bound limit so long as the conic-section and/or parabolic mirror is an adequate size. While not shown in FIG. 2, the array of lenses (e.g., array of lenses 112 of FIG. 1) would be similarly configured such that the lenses in the array of lenses would align with the individual camera sensors 202 in the array of camera sensors 200.

In some cases, the field of view (FOV) of tomographic 3D reconstruction may be limited by the depth of field of the conic-section and/or parabolic mirror and its tilt aberrations. One solution may involve using lenses with different focal lengths in the array of lenses. In some cases, this is accomplished by physically swapping out the lenses for lenses with different focal lengths. In some cases, the array of lenses includes lenses with refocusable lens units. In some cases, to increase spatial resolution to a tomogram, the 3D FOV can be sacrificed by increasing the aperture sizes in the array of apertures 316.

Figure 3A:
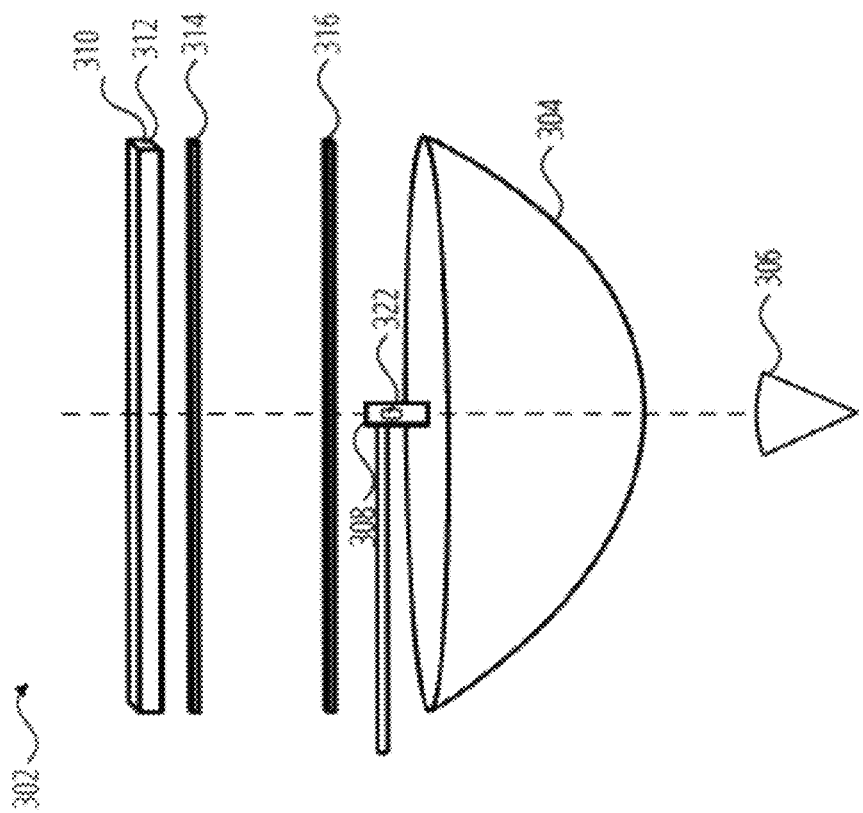
FIG. 3A illustrates a $2\pi$-FLIFT imaging system with an array of apertures.

FIG. 3A illustrates a 2π-FLIFT imaging system with an array of apertures. The 2π-FLIFT imaging system 302 includes a conic-section and/or parabolic mirror 304, a light source 306, a sample holder 308, an array of camera sensors 310, an array of lenses 312, a fluorescence emission filter array 314 and an array of apertures 316.

The fluorescence emission filter array 314 is positioned between the array of camera sensors 310 and the sample holder 308. The fluorescence emission filter array 314 can be inserted directly below the array of lenses 312.

The array of apertures 316 includes a plurality of apertures, each aperture corresponding to a lens/camera sensor pair of the array of lenses 312 and the array of camera sensors 310. The array of apertures 316 may be approximately ($f_{lens}$) below the principal plane of the array of lenses 312 (e.g., their Fourier planes).

Figure 3B:
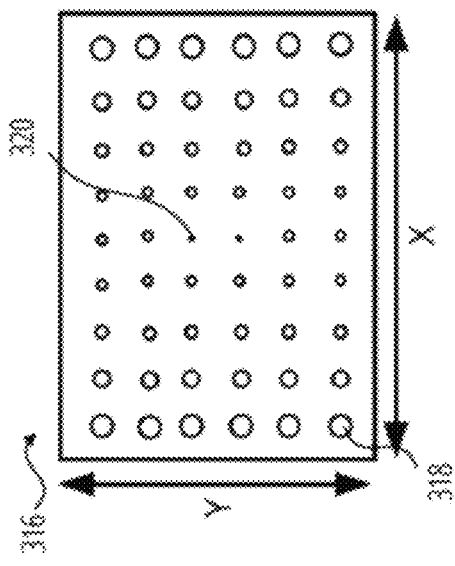
FIG. 3B illustrates an example array of apertures.

FIG. 3B illustrates an example array of apertures. Referring to FIG. 3B, the apertures (e.g., aperture 318 and aperture 320) of the array of apertures 316 can have varying diameters. The variation in the diameters of the individual apertures of the array of apertures 316 tunes the lateral resolution and depth of field, and also accounts for incident angle-dependent effective focal lengths. When using an array of apertures, such as the array of apertures 316, the effective focal length increases according to the equation:

$$f_{\text{eff}}(r) = f_p + \frac{r^2}{4f_p}$$

in the case of a parabolic mirror. Although this equation is specific to parabolic mirrors, this equation (and others described herein) can be modified (e.g., via known modifications that are apparent to those having ordinary skill in the art) to account for other types of conic-section mirrors, including but not limited to spherical and ellipsoidal mirrors.

A diameter of each aperture of the array of apertures 316 may increase in diameter from a center of the array of camera sensors to a periphery of the array of camera sensors (e.g., compared to a center of the array of camera sensors). For example, the diameter of aperture 318 is larger than the diameter of aperture 320.

Computational Modeling of the Imaging Optics

In order to perform 3D reconstructions of images taken by a 2π-FLIFT imaging system, it is beneficial to model the ray trajectories propagating between camera sensors and the sample. Bundle adjustment (BA) is simultaneous refining of the 3D coordinates describing the scene geometry, the parameters of relative motion, and the optical characteristics of the camera sensors used to acquire the images, given a set of images depicting a number of 3D points from various view points. Rays can be propagated from the camera sensor to the sample or from the sample to the camera sensor. Traditionally, for BA algorithms used in feature-point-based 3D point cloud reconstruction algorithms in a computer vision (e.g., photogrammetry and/or structure-from-motion), the rays are propagated from the sample to the cameras as part of a process called reprojection.

Because a parabolic mirror used in the 2π-FLIFT imaging system is unlikely to be perfectly parabolic (e.g., due to manufacturing errors) and since optics of the sample holder may be difficult to model parametrically, the ray propagation results can be refined with nonparametric modeling (e.g., polynomials, Zernike polynomials, kernel estimation).

To calibrate misalignments and imperfections of the 2π-FLIFT imaging system, a calibration can be carried out on the camera array and mirror using, for example a fiber optic cannula with a diffuser tip mounted on a 3-axis motorized translation stage. In some cases, the 2π-FLIFT imaging system may include a single fluorescent microsphere (as opposed to the fiber optic cannula). Other calibration methods can be used, including for the sample holder (e.g., a NMR tube) and for the reconstruction methods (e.g., refining sample-incident rays and estimation of a low resolution reconstruction).

Figure 4:
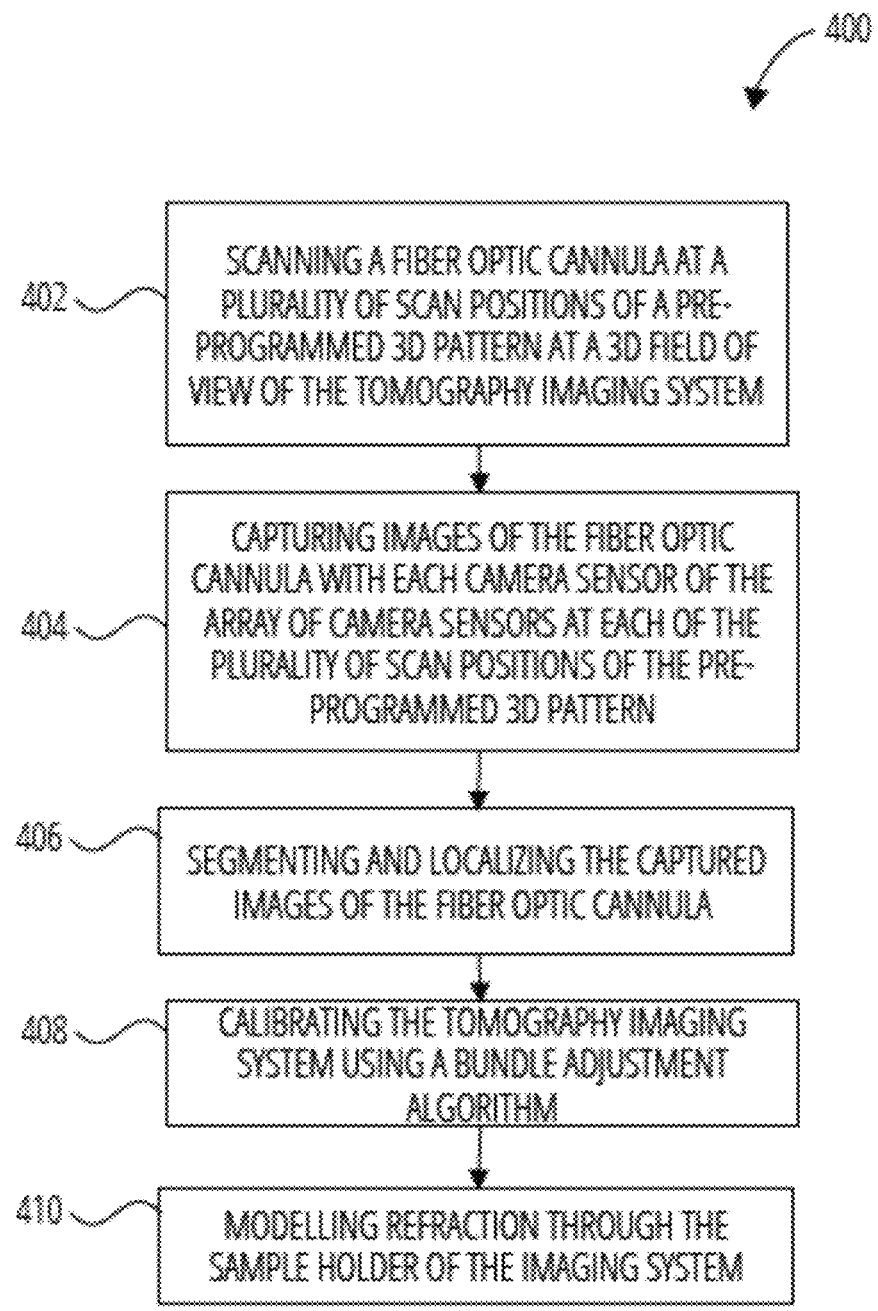
FIG. 4 illustrates an example $2\pi$-FLIFT imaging system calibration method.

FIG. 4 illustrates an example 2π-FLIFT imaging system calibration method. The calibration method 400 includes scanning (402) a fiber optic cannula diffuser tip at a plurality of scan positions of a pre-programmed 3D pattern at a 3D field of view of the tomography imaging system, capturing (404) images of the fiber optic cannula diffuser tip with each camera sensor of the array of camera sensors at each of the plurality of scan positions of the pre-programmed 3D pattern, segmenting and localizing (406) the captured images of the fiber optic cannula diffuser tip, calibrating (408) the tomography imaging system using a bundle adjustment algorithm, and modelling (410) refraction through the sample holder of the tomography imaging system imaging system. The tomography imaging system may further include a controller (e.g., controller 604 of FIG. 6A), which is configured to perform the calibration method 400.

In some cases, scanning (402) the fiber optic cannula includes moving the cannula fiber in a pre-programmed (i.e., "known") 3D pattern across the 3D FOV of the 2π-FLIFT imaging system. An example 3D pattern is a 3D grid. While the fiber optic cannula is scanned (402) in the pre-programmed 3D pattern, the camera sensors in the array of camera sensors of the 2π-FLIFT imaging system capture (404) images of the fiber optic cannula at a plurality of scan positions. In the images captured by the camera sensor, the fiber optic cannula's diffuser tip will show up as a single small point in each image. The captured images are segmented and localized (406) as feature points in the BA algorithm to calibrate system misalignments and imperfections.

The 2π-FLIFT imaging system may then be calibrated (408) using a modified BA algorithm. The disclosed BA algorithm propagates the rays from the camera sensors to the sample (as opposed to traditional BA algorithms which propagate the rays from the sample to the sensor). Therefore, the disclosed BA algorithm (e.g., backwards BA algorithm) computes a back-projection error in a sample rather than the reprojection error in the camera space.

The back-projection error is computed by minimizing the shortest distance between each ray and the object point to which it corresponds. That is, given a ray defined by $r=(z, y, z)^T$, a unit vector $u=(u_x, u_y, u_z)^T$, and an object point $r_{obj}=(x_{obj}, y_{obj}, z_{obj})^T$ (all defined as column vectors), the shortest distance is given by $d_{min}=|r_{closest}-r_{obj}|$, where $r_{closest}=r+((r_{obj}-r) \cdot u)u$ is the closest approach of the ray to the object point. The object point is the localized images of the fiber optic cannula. This minimizes the mean square distance of every ray to its corresponding object point with respect to the optical system calibration parameters. In addition to optimizing the optical system parameters, the disclosed method can also optimize the relative 6D pose of the stage trajectory.

The bundle algorithm providing the "best" point of intersection, given a collection of rays indexed by i, $\{r_i, u_i\}_i$, can be shown to be:

$$\hat{r}_{obj} = \operatorname*{argmin} \sum_i |r_{closest,i} - r_{obj}| = \left[\sum_i (u_i u_i^T - I_3)\right]^{-1} \left[\sum_i u_i u_i^T r_i\right],$$

where $I_3$ is a 3×3 identify matrix.

This approach is advantageous over a random distribution of point emitters. First, because the fiber tip is in the air, there is no need to model the sample holder's optics at the same time, thus simplifying the calibration problem. Second, this method does not require matching points across different images, which may be thwarted by similarity in appearance of different point emitters within the sample. Thus, since the trajectory of the fiber tip is pre-programmed, the ground truth location is known.

However, there may be cases where the object points are unknown. In this case, the object points can be treated as optimizable variables or computed as the points that minimize the closest distance squared to all rays that correspond to the same object point.

Modelling (410) the refraction through the sample holder can be accomplished using Snell's law and modelling the sample holder as a cylindrical tube with a hemispherical tip with a radius r and a uniform wall thickness t. If the material is known, the refraction index (RI) can be fixed, or the RI of the wall, as well as the RI of the medium in which the sample resides (e.g., water or air), may be fine tuned. Alternatively, or in addition, the refraction can be modeled nonparametrically (e.g., polynomial coefficients with no physical meaning).

For a calibration sample, the step of scanning the fiber cannula may be employed after placing the fiber cannula within the sample holder (if feasible). In some cases, a random distribution of fluorescent microspheres may yield an easier reconstruction given the already optimized system calibration parameters for everything but the sample holder. This step may also be combined with a tomographic sample reconstruction algorithm.

Tomographic Reconstruction

After the 2π-FLIFT imaging system parameters are calibrated (e.g., via method 400 described with respect to FIG. 4) the rays from the sensor to the conic-section and/or parabolic mirror's focus (i.e., where the sample is positioned) may be accurately propagated. There are several options for the sample tomographic reconstruction algorithm. These options depend on the assumptions made with respect to the light-sample interaction. In some cases, the simplest reconstruction algorithm may be one similar to the ray-based filtered back-projection algorithm used in computed tomography (CT). In some cases, a modified version of the algebraic reconstruction technique (AR) may be used. In some cases, wave-based models may also, or alternatively be used.

In some cases, a gradient-based algorithm that iteratively minimizes error between a forward prediction based on a physical light propagation model and the measured camera data (e.g., captured images) is utilized that updates the 3D or 4D (e.g., 3D plus time, such as a 3D video feed) reconstruction of the moving object. For example, for a 3D tomographic reconstruction image, the 2π-FLIFT imaging system can include a controller (e.g., controller 604 of FIG. 6A) having a processor and a memory storing instructions that direct the imaging system to simultaneously capture a set of images of the sample and create (e.g., computationally) a 3D tomographic reconstruction image from set of images. Each camera sensor of the array of camera sensors captures an image of the set of images. As another example for 4D tomographic reconstruction images/video feed, the instructions can direct the imaging system to capture a plurality of sets of images of the sample and create (e.g., computationally) a plurality of 3D tomographic reconstruction images from the plurality of sets of images. In this example, each set of images of the plurality of sets of images are captured simultaneously, each camera sensor of the array of camera sensors captures one image for each set of images of the plurality of sets of images, and an image of the plurality of 3D tomographic reconstruction images is created for each set of images of the plurality of sets of images.

One example approach may be used with the 2π-FLIFT imaging system 302 of FIG. 3A, which includes a fluorescence emission filter array (e.g., fluorescence emission filter array 314). It is assumed that the illumination light evenly excites all fluorophores across a weakly-scattering 3D sample. Upon excitation, the fluorophores are assumed to emit fluorescence evenly in every direction, such that the incident illumination direction or angular distribution does not matter. A ray-based forward model involving projections along straight lines defined by the result of ray propagation through the calibrated tomography imaging system can be used. The mean square error between the linear projections and the measured data with respect to the sample 3D reconstruction may be iteratively minimized. In some cases, when the excitation light and fluorescence emission are significantly attenuated by the sample due to scattering or absorption, the voxel-wise 3D tomographic attenuation map is modeled. In some cases, sample-induced refraction is modeled to recover a voxel-wise tomographic RI map. Upon iterative reconstruction, the described methods can yield tomographic 3D reconstructions of fluorescence, attenuation coefficients, and RI, among other possibilities.

In some cases, when frame rates of the cameras are limited by data transfer, the speed is improved by down-sampling the images. Alternatively, or in addition to downsampling the images, to improve speed, the images are cropped with a predefined crop, or a sample-adaptive, content-aware cropping scheme.

Figure 5:
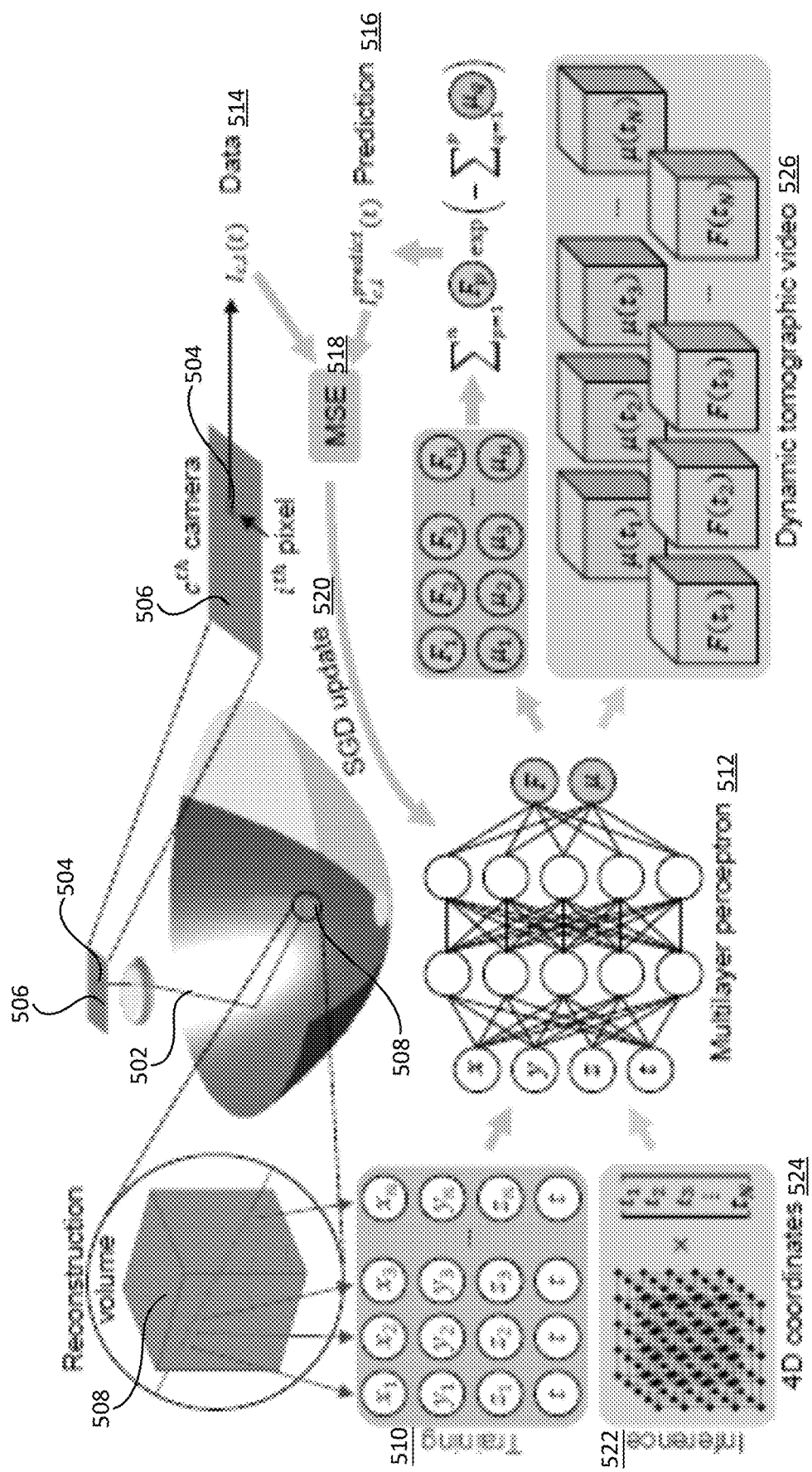
FIG. 5 illustrates a specific embodiment of dynamic tomographic reconstruction of a 3D object.

FIG. 5 illustrates a specific embodiment of dynamic tomographic reconstruction of a 3D object. Referring to FIG. 5, a single chief ray 502 from one pixel 504 of one camera sensor 506 is illustrated for clarity, although it should be understood that chief rays from pixels of every camera sensor is used for dynamic tomographic reconstruction of a 3D object 508. In the training step 510, n coordinates along the chief rays are sampled and passed through the multilayer perceptron (MLP) 512 to predict the fluorescence (F) and attenuation (μ) values at those corresponding coordinates. These values are used in the forward model to predict the measured intensity at the pixel, with the difference between the measured intensity 514 and the prediction of the measured intensity 516 being used to compute the mean square error (MSE) 518. The MSE 518 is then minimized via stochastic gradient descent (SGD) 520 with respect to the MLP 512. After the training step 510, the inference step 522 queries, by the MLP 512, the dense 4D coordinates 524 across all 3D positions across time to reconstruct the full, 2-channel dynamic tomographic videos 526 with N frames.

Alternate Embodiments

In some cases, the tomography imaging system may not include a conic-section and/or parabolic mirror. In some cases, instead of a conic-section and/or parabolic mirror, the lenses in the array of lenses are positioned in a conic-section array (e.g., in the shape of a parabolic mirror). In some cases, the array of cameras spans the full rotationally symmetric parabolic mirror.

In some cases, the array of cameras spans only half the parabolic mirror with a 90 degree-rotated sample. In this case, it could be easier to access the sample, as the sample would not be surrounded by almost all sides. In some cases, the array of cameras is in a circular arrangement (e.g., only along the boundary), wherein the radius of the circle is $2f_p$. In some cases, the radius of the ring of cameras is less than $2f_p$.

In some cases, the array of apertures includes arbitrary pupil patterns, specifying both amplitude and phase. In this case, the degree of freedom could be useful in overcoming FOV limitations. In particular, the limited depth of field of each camera image could be extended, for example, using a cubic phase mask. Similarly, a pupil pattern could be designed to expand the lateral field of view of each camera in the array of cameras by overcoming the conic-section and/or parabolic mirror-induced tilt aberrations.

In some cases, the array of cameras, the array of lenses, and/or array of apertures laterally scans the sample and the conic-section and/or parabolic mirror in concert or, equivalently. Lateral scanning has the effect of observing the sample from different incidence angles, allowing for denser sampling of the 2π-steradian solid angle. In some cases, only the array of apertures is laterally scanned, which produces a similar affect assuming the apertures are smaller than the lens apertures. In some cases, the array of apertures is scanned axially, which changes the object-side telecentricity and introduces a new angular information. In some cases, the sample can be scanned in 3D to expand the 3D field of view. In some cases, the array of lenses is axially scanned (e.g., independently of the array of camera sensors).

Applications of the tomography imaging system can include imaging freely swimming zebrafish larvae at high speed or imaging other millimeter-scale model organisms. In addition, there are also potential surgical applications with certain configurations of the systems and methods disclosed that may provide real-time 3D tomographic feedback not available in conventional microscope-guided surgeries. For example, existing surgical microscopes can be augmented by coaxially aligning the object with a conic-section and/or parabolic mirror while having the imaging paths of the array of cameras and the array of lenses flanking the surgical microscope so that they have entry positions beyond $2f_p$.

FIG. 6A illustrates a system controller for implementing functionality of a 2π-FLIFT imaging system. Referring to FIG. 6A, a 2π-FLIFT imaging system 602 can include a controller 604 coupled to an array of camera sensors via a camera sensor interface 606 and a calibration interface 608. In some cases, the controller 604 can include or be coupled to a communications interface 610 for communicating with another computing system, for example computing system 612 of FIG. 6B. Controller 604 can include one or more processors with corresponding instructions for execution and/or control logic for controlling the 2π-FLIFT imaging system (e.g., as described herein) and can include instructions (executed by the one or more processors) and/or control logic for controlling the calibration configuration as described with respect to FIG. 4. Images captured by the camera sensors of the array of camera sensors can be processed at the controller 604 or communicated to another computing device via the communications interface 610. In some cases, the controller 604 performs the method 400.

Figure 6B:
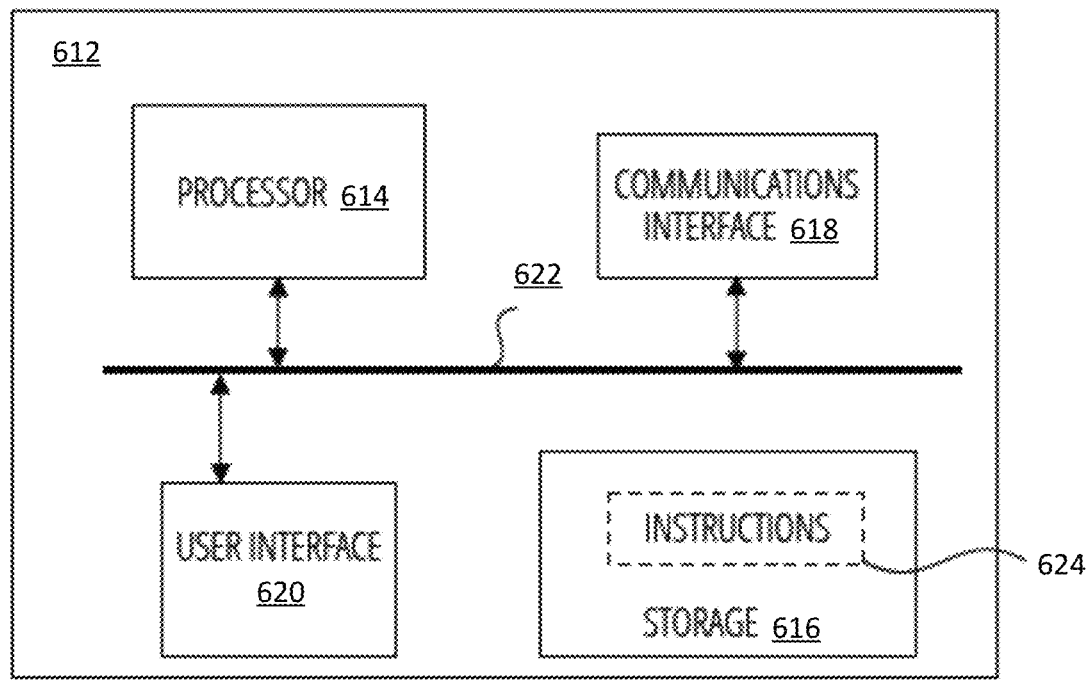
FIG. 6B illustrates a computing system that can be used for a $2\pi$-FLIFT imaging system.

FIG. 6B illustrates a computing system that can be used for a 2π-FLIFT imaging system. Referring to FIG. 6B, a computing system 612 can include a processor 614, storage 616, a communications interfaces 618, and a user interface 620 coupled, for example, via a system bus 622. Processor 614 can include one or more of any suitable processing devices ("processors"), such as a microprocessor, central processing unit (CPU), graphics processing unit (GPU), field programmable gate arrays (FPGAs), application-specific integrated circuits (ASICs), logic circuits, state machines, application-specific standard products (ASSPs), system-on-a-chip systems (SOCs), complex programmable logic devices (CPLDs), etc. Storage 616 can include any suitable storage media that can store instructions 624 for generating composite images from the micro-camera array as well as the method 400. Suitable storage media for storage 616 includes random access memory, read only memory, magnetic disks, optical disks, CDs, DVDs, flash memory, magnetic cassettes, magnetic tape, magnetic disk storage or other magnetic storage devices, or any other suitable storage media. As used herein "storage media" do not consist of transitory, propagating waves. Instead, "storage media" refers to non-transitory media.

Communications interface 618 can include wired or wireless interfaces for communicating with a system controller such as described with respect to FIG. 6A as well as interfaces for communicating with the "outside world" (e.g., external networks). User interface 620 can include a display on which the composite images can be displayed as well as suitable input device interfaces for receiving user input (e.g., mouse, keyboard, microphone).

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A tomographic 3D imaging system, comprising:
a conic-section mirror serving as the imaging objective;
a sample holder positioned to hold a sample at a focus ($f_p$) of the conic-section mirror;
a light source directing light to the sample; and
an array of camera sensors positioned above the conic-section mirror.

2. The imaging system of claim 1, wherein the array of camera sensors is further positioned parallel to a directrix of the conic-section mirror.

3. The imaging system of claim 1, wherein the conic-section mirror is a parabolic mirror.

4. The imaging system of claim 3, wherein each camera sensor of the array of camera sensors is positioned facing the sample holder at an inclination angle dictated by a lateral position of the camera sensor according to $$\theta(r) = 2\tan^{-1}\left(\frac{r}{2f_p}\right),$$

where r is the radial entry position across the parabolic mirror.

5. The imaging system of claim 3, wherein an outermost camera sensor of the array of camera sensors from a parabolic axis of the parabolic mirror is less than $2f_p$.

6. The imaging system of claim 3, wherein an outermost camera sensor of the array of camera sensors from a parabolic axis of the parabolic mirror at $2f_p$.

7. The imaging system of claim 3, wherein an outermost camera sensor of the array of camera sensors from a parabolic axis of the parabolic mirror greater than $2f_p$.

8. The imaging system of claim 1, wherein the conic-section mirror has an aperture at a bottom of the conic-section mirror and the light source directs light to the sample through the opening of the conic-section mirror.

9. The imaging system of claim 1, further comprising an array of lenses positioned between the array of camera sensors and the sample holder, each lens of the array of lenses aligning with a corresponding camera sensor in the array of camera sensors, wherein each lens of the array of lenses is a focal length distance ($f_{lens}$) away from the corresponding camera sensor of the array of camera sensors.

10. The imaging system of claim 9, further comprising a fluorescence emission filter array positioned between the array of lenses and the sample holder and parallel to the array of lenses.

11. The imaging system of claim 10, wherein the bundle adjustment algorithm comprises a backwards bundle adjustment algorithm that computes a back-projection error in the sample.

12. The imaging system of claim 1, further comprising an array of apertures, each aperture of the array of apertures aligning with a corresponding camera sensor in the array of camera sensors, wherein a size of the array of corresponding apertures increases in diameter from a center of the array of camera sensors to a periphery of the array of camera sensors.

13. The imaging system of claim 1, wherein the lenses are refocusable lens units.

14. The imaging system of claim 1, wherein the sample holder is a transparent container having a uniform wall thickness.

15. The imaging system of claim 14, wherein the transparent container is a spherical shell.

16. The imaging system of claim 1, further comprising:
a fiber optic cannula with a diffuser tip;
a 3-axis motorized translation stage, wherein the fiber optic cannula with the diffuser tip is mounted onto the 3-axis motorized translation stage; and
a controller comprising a processor and memory, the memory storing instructions that when executed by the controller, direct the imaging system to:
scan the fiber optic cannula with the diffuser tip at a plurality of scan positions of a pre-programmed 3D pattern at a 3D field of view of the imaging system;
capture images of the fiber optic cannula with the diffuser tip with each camera sensor of the array of camera sensors at each of the plurality of scan positions of the pre-programmed 3D pattern;
segment and localize the captured images of the fiber optic cannula diffuser tip;
calibrate the imaging system using a bundle adjustment algorithm; and
model refraction through the sample holder of the imaging system.

17. The imaging system of claim 1, further comprising a controller comprising a processor and memory, the memory storing instructions that when executed by the controller, direct the imaging system to:
simultaneously capture a set of images of the sample, wherein each camera sensor of the array of camera sensors captures an image of the set of images; and
create a 3D tomographic reconstruction image from set of images.

18. The imaging system of claim 1, wherein the instructions further direct the imaging system to:
capture a plurality of sets of images of the sample, wherein each set of images of the plurality of sets of images are captured simultaneously, wherein each camera sensor of the array of camera sensors captures one image for each set of images of the plurality of sets of images; and
create a plurality of 3D tomographic reconstruction images from the plurality of sets of images; wherein an image of the plurality of 3D tomographic reconstruction images is created for each set of images of the plurality of sets of images.

* * * * *